(12) United States Patent
Dubé

(10) Patent No.: US 7,094,144 B2
(45) Date of Patent: Aug. 22, 2006

(54) VENTILATION BARRIER

(76) Inventor: Jean-Guy Dubé, 328 Bas de la Rivière, St.-Pie de Bagot, Quebec (CA), J0H 1H0

( * ) Notice: Subject to any disclaimer, the term of this patent is extended or adjusted under 35 U.S.C. 154(b) by 221 days.

(21) Appl. No.: 10/461,317

(22) Filed: Jun. 13, 2003

(65) Prior Publication Data

US 2004/0253919 A1 Dec. 16, 2004

(30) Foreign Application Priority Data

Jun. 12, 2003 (CA) .............................. 2432097

(51) Int. Cl.
F24F 7/00 (2006.01)

(52) U.S. Cl. ............................................. 454/334; 52/2

(58) Field of Classification Search ................ 454/333, 454/334, 259, 275; 52/2

See application file for complete search history.

(56) References Cited

U.S. PATENT DOCUMENTS

| | | |
|---|---|---|
| 2,990,837 A | 7/1961 | Cushman |
| 4,290,242 A | 9/1981 | Gregory, Jr. |
| 4,297,813 A | 11/1981 | Farrell et al. |
| 4,301,626 A | 11/1981 | Davis et al. |
| 4,305,235 A | 12/1981 | Roston |
| 4,318,251 A | 3/1982 | Winkler |
| 4,352,259 A | 10/1982 | Smith et al. |
| 4,672,888 A | 6/1987 | Crombie et al. |

*Primary Examiner*—Derek S. Boles
(74) *Attorney, Agent, or Firm*—Schweitzer Cornman Gross & Bondell LLP

(57) ABSTRACT

A multi-layer barrier for insulation blocking an opening or passage of a building and for providing ventilation to or within a building. A plurality of inflated hollow membrane cube-like structures are formed adjacent to one another, which traverse a longitudinal width of the opening or passage. The hollow membrane cube-like structures are formed from generally rectangular sheets having two long parallel edges, two parallel short edges and a floor having one or more orifices in the forming floor of each non-bottom sheet between membranes, for air connection between membrane structures to be changed from an inflated and a deflated state.

8 Claims, 2 Drawing Sheets

VENTILATION BARRIER

FILED OF THE INVENTION

The invention relates to a multi-layer barrier to provide ventilation to or within a building.

BACKGROUND OF THE INVENTION

The present invention relates to a novel inflatable multi-layer barrier mounted so as to provide insulation to or within a building. The present invention relates particularly to such a barrier system for use in agricultural buildings, such as barns, livestock or animal housing buildings, greenhouses and the like.

Inflatable vent systems contemplated by the prior art include a cover assembly for sealably permitting the closure and opening of such vent openings by inflating and deflating a horizontal multi-sectioned tubular mat assembly which is mounted exteriorly or interiorly to the opening of a building, usually a greenhouse.

There have been a number of mat-like inflatable partition assemblies that have been developed for controlling the ventilation, lighting, humidity and temperature inside a building. Some of these vent assemblies extend across the ceiling of a greenhouse at various heights so as to provide an overlying insulating cover and/or to minimize the air space to be heated. For example, such assemblies are discussed at U.S. Pat. Nos. 4,038,788; 4,290,242; 4,297,813; 4,301,626; 4,305,235; 4,318,251 and 4,352,259.

U.S. Pat. No. 4,290,242 describes a plurality of clear polyethylene tubes extending in a spaced adjacent relationship longitudinally across a greenhouse at the edge of a roof that projects beyond the wall. Once again, the system is intended for application in a greenhouse structure.

More specifically, U.S. Pat. No. 4,672,888 describes an expandable mat-like vent closure apparatus comprising a clear inflatable mat, the opposed surfaces being seated to one another to form a plurality of horizontal tubular members with a plurality of internal air passages connected to one another. The plurality of horizontal tubular membranes are formed from a single sheet sealed together horizontally at various intervals by spot seal.

The disadvantage of this vent closing structure and system is that the membranes are tubular and the points of attachment of the single membrane are spot sealed which cause "valleys" in the membrane barrier structure on both sides.

These "valleys" are points where the insulation value of the barrier is essentially minimal as there is no air barrier between the ambient exterior conditions and the interior of the building, this hindering the ability to optionally and economically control conditions in the building, such as temperature and the like.

In particular, the "valley" structures associated with the spot seals form areas where condensation may accumulate on either side of the barrier structure, again inhibiting the insulation value of the barrier as well as adding weight to the barrier requiring more energy to maintain the barrier inflated or inhibiting or preventing, due to the load, inflation and thus closure of the barrier, requiring the inconvenience of removal of the accumulated condensation for proper function of the barrier system.

Another problem associated with this prior art structure is that due to spot sealing of a single membrane sheet, the structure is lacking in rigidity, being more flimsy and limited in the practical height of the membrane structure which may be achieved by air inflation of the structure. This creates a practical limit as to the size of opening with which the prior art barrier may be used.

The improvement of this invention lies in that the plurality of inflatable hollow membranes structures are cube-like instead of tubular and thus there is increased rigidity, insulating value and no longer a need for spot seals between each tubular membrane. The multi-layer barrier allows for ventilation and prevents heat loss. The multi-layer insulating barrier lies in the gutter of a frame, composed of an upper and lower support, which allows for the movement of the barrier when it is being inflated. As required, there is also a plurality of vertical supports that are mounted to the upper and lower channels and are sufficiently spaced to prevent sagging of the barrier when it is being inflated or deflated.

Another advantage of the present invention is that the cube-like membranes ensure that the barrier is more resilient and durable and thus a greater number of cube-like membranes can be stacked one on top of the other, allowing increase in the practical height of the insulating barrier. The barrier systems existing in the prior art are limited to approximately 5 feet because of the lack of resilience in the inflatable sheet due to its weakness in construction, whereas the present invention will permit a barrier up to approximately double this height.

SUMMARY OF THE INVENTION

It is an object of the present invention to provide a multi-layer barrier for sealing an opening or passage of a building and for providing ventilation to or within a building.

Another object of the present invention is to provide an apparatus for providing insulation blocking to or within an opening or passage of a building by using a multi-layer barrier.

The improvement consists of a multi-layer barrier for sealing an opening or passage of a building comprising: a plurality of inflatable hollow horizontal membrane cube-like structures formed adjacent to one another which traverse a longitudinal width of the opening or passage; the hollow membrane structures are formed from generally rectangular sheets of resilient, flexible material having two generally parallel long edges and two generally parallel short edges at generally right angles to the long edges wherein the multi-layer barrier includes a generally bottom sealing sheet and one or more structure sheets. Each long edge of a non-bottom structure sheet being longitudinally sealed to an intermediate longitudinal axis of an immediately subsequent non-bottom sheet to form a hollow cube-like structure, and the longitudinal seals on the bottom sheet being generally along the edges of the bottom sheet. The longitudinal sealing axes forming the hollow membrane structure having an outside surface and an inside surface and a floor, the floor of each membrane structure except for the generally most bottom cube-like membrane having one or more orifices for air connection between membrane structures to allow the cube-like structure to be transformable between an inflated and a deflated state. Each of the cube-like membranes are sealed at their ends in any conventional manner suitable for this purpose such as by heat sealing of the ends or by mechanical means.

The multi-layer barrier is positioned in a frame consisting of an upper and a lower support, two vertical ends and has a plurality of vertical supports for guiding the insulating barrier during the inflating and deflating process.

The cube-like membranes have a plurality of air passages opening on the floor of each membrane structure for air connection between membranes. In use of the barrier structure, a connection means is connected to an inflating means, which is attached to the uppermost cube-like membrane, which allows air to enter the membranes structures, and, as such, the membranes structures are inflated or deflated, as required. Thus, if it is a beautiful hot summer day, the barrier remains in a deflated state; and, conversely, on a cold winter day, the barrier is inflated to provide insulation and ventilation as required to or within a building. The inflation means can be in the form of an air pump; air compressor; air blower or the like and the connecting means can be a tube conduit of the like. Coupled to the inflation means is preferably a control mechanism that controls the amount of ventilation given to the enclosure and also determines the humidity and temperature of the enclosure.

The present invention also contemplates an apparatus for insulation blocking of an opening or passage of a building and for providing ventilation to or within a building by using the multi-layer barrier. The apparatus comprises the barrier structure in combination with a frame structure which defines the opening or passage, which consists of top and bottom supports, two vertical ends and a plurality of vertical supports, an inflation means and a connecting means. The barrier is positioned in the frame using any method known in the art and the frame in turn defines the opening or passage of the building. The connecting means is attached to a inflating means at one end and to the uppermost cube-like membrane at the other end and air is allowed to enter the membranes lengthwise causing the barrier to inflate and the plurality of vertical supports guide the barrier during inflation.

DETAILED DESCRIPTION OF THE PREFERRED EMBODIMENTS

Figure 1:
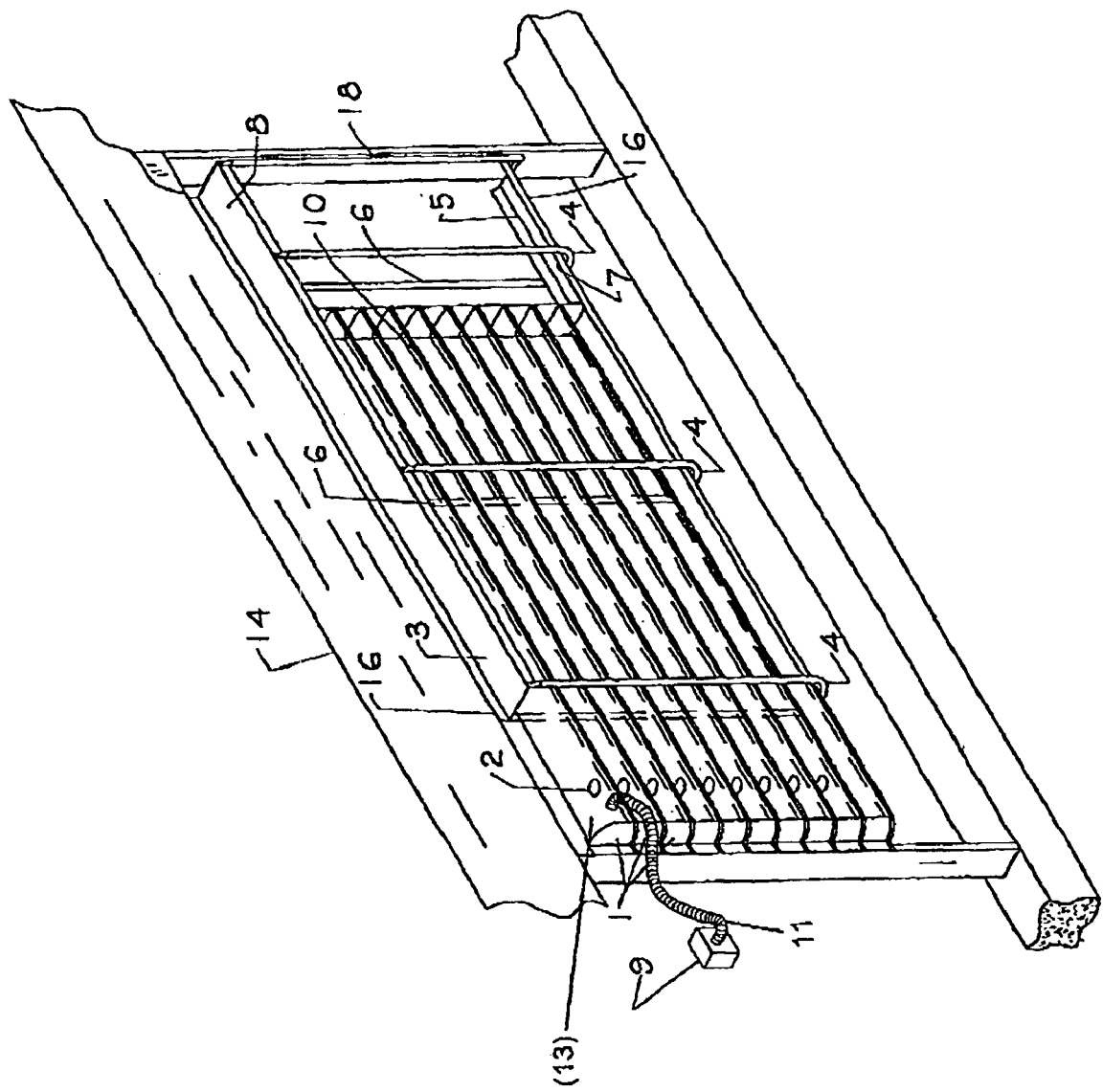
FIG. 1 is a perspective view of the insulation barrier

Referring to FIG. 1, a perspective view of the multi-layer barrier (10) is shown whereby the cube-like membranes (1) are inflated, and thus form a barrier to seal any opening or passage (14) of a building. As shown, the multi-layer barrier (10) is positioned in a frame (8), which in turn defines the opening or passage (14) of a building. Depending on the size of the opening or passage of a building, the height of the barrier (10) and length of the cube-like membranes (1) are adjusted to provide sufficient insulation to or within a building. This multi-layer barrier can also be used as a ventilation device between two rooms in a building.

The insulating barrier is mounted to an external support frame structure (16) made of wood, steel, aluminum or any other suitable weather resistant material. The top and bottom supports (16) of the frame (8) and the two vertical ends (18) of the frame (8) defines the opening of a building or passage (14). When the insulating barrier (10) is in a deflated state, it is retained within the gutter (5) of the lower external support (16). The frame (8) support structure further comprises an upper (3) and lower (5) gutter, a plurality of vertical supports (4) and (6) that are transversely mounted either closer or farther apart from one another depending on the size of the barrier and to prevent sagging of the barrier. The support assembly thus contains the expansion of the barrier between the frame and vertical support and, when fully inflated, the insulating barrier operates to seal an opening between the top and bottom supports (16) and two vertical ends (18).

The barrier (10) is inflated from top to bottom by using an inflation means (9) to which a connecting means (11) is attached. The connecting means (11) is attached to the floor (2) of the uppermost membrane structure at one end and to an inflation means (9) at the other end. For this purpose, the connecting means (11) can be a tube conduit or the like, which is attached to an inflating means (9), which, for this purpose, can be an air pump; air compressor; air blower or the like. As air is allowed to enter the uppermost membrane (13), inflation occurs lengthwise and there is an increase in the internal pressure so as to force air into the other cube-like membranes causing the next lower cube-like membrane to fill up with air. The process is repeated until all cube-like membranes are inflated. Deflation occurs in a reverse fashion. The rigidity of the insulating barriers depends on the amount of air pressure in the membranes.

A control mechanism may be located on the inflation means (9), which controls the airflow and, as such, any increase or decrease the pressure of the air within the cube-like membrane structure. Furthermore, there may be a an environment/temperature control located on the inflation means (9), which measures the humidity and temperature within the enclosure and, as such, determines the degree of ventilation required.

Figure 2:
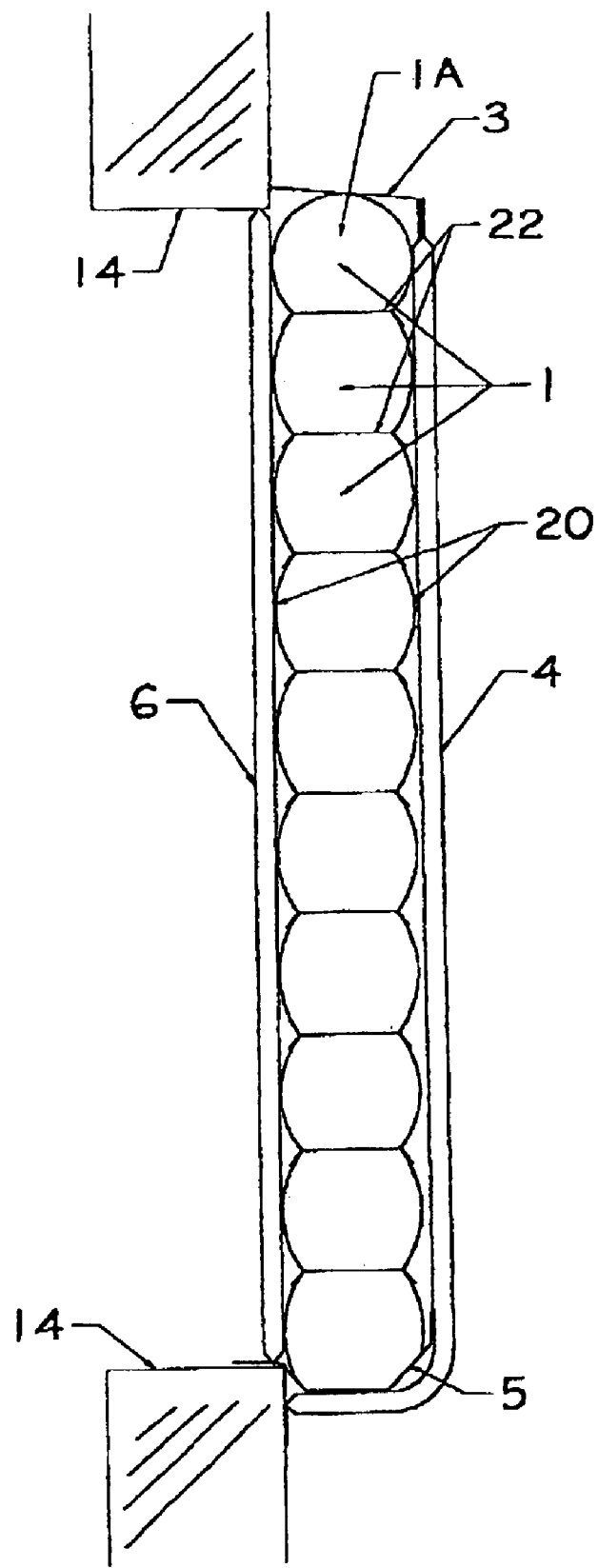
FIG. 2 is a cross-sectional view of the cube-like membranes

Directing attention to FIG. 2, a cross-sectioned view of the insulating barrier (10) which shows the membranes in an inflated state. From this figure, each hollow membrane is cube-like in shape, except for the top-end membrane, which is circular (1a). The insulating barrier has a plurality of inflatable hollow cube-like membrane structures (1) formed adjacent to one another which traverse the longitudinal width of the opening or passage (14). The hollow membrane cube-like structures are formed from rectangular sheets of resilient, flexible material, preferably polyethylene, having two generally parallel long edges (22) and two generally short edges (20) at generally right angles to the long edge wherein the barrier includes a generally sealing bottom sheet and a plurality of one or more structure sheets, each long edge of a non-bottom structure sheet being longitudinally sealed to an intermediate longitudinal axis of an immediately subsequent non-bottom sheet, and the longitudinal seals of the end sheet are along the edges of the bottom sheet.

The above description fully discloses the invention including preferred embodiments thereof. Modifications and improvements of the embodiments specifically disclosed herein are within the scope of the following claims. It is believed that a person skilled in the art can, without further elaboration, given the preceding description, utilize the present invention to its fullest extent.

I claim:

1. A multi-layer barrier for use in insulation blocking an opening or passage of a building and for providing ventilation to or within a building, the improvement comprising:

a plurality of inflatable hollow membrane cube-like structures formed adjacent to one another which traverse a longitudinal width of the opening or passage of a building;

the hollow membrane cube-like structures formed from generally rectangular sheets of resilient, flexible material having two generally parallel long edges and two generally short edges at generally right angles to the long edges wherein the multi-layer barrier includes a generally bottom sealing sheet and a plurality of one or more structure sheets, each long edge of a non-bottom structure sheet being longitudinally sealed to an intermediate longitudinal axes of an immediately subsequent non-bottom sheet to form a hollow membrane cube-like structure, and the longitudinal seals on the bottom sheet being generally along the edges of the bottom sheet;

the longitudinal sealing axes forming the hollow membrane cube-like structures having an outside surface and an inside surface and a floor, the floor of each membrane structure except for the generally most bottom cube like membrane having one or more orifices for air connection between membrane structures to allow the membrane cube-like structures to be transformable between an inflated and a deflated state; each of the cube-like membranes having sealed ends and the barrier is adapted to be positioned in a frame comprising horizontal upper and lower supports, two vertical ends and a plurality of vertical supports, the vertical supports are sufficiently spaced and transversely mounted to the upper and lower supports for guiding the barrier during the inflation and deflation process.

2. The multi-layer barrier of claim 1, wherein the resilient and flexible material is polyethylene.

3. An apparatus for the insulation blocking of an opening comprising the barrier of claim 1 or 2, wherein the barrier is positioned in a frame comprising horizontal upper and lower supports, two vertical ends and a plurality of vertical supports, the vertical supports are sufficiently spaced and transversely mounted to the upper and lower supports for guiding the barrier during the inflation and deflation process; a connecting means; and an inflating means; wherein the connecting means is attached to the inflation means at one end and to the uppermost membrane cube like structure at the other end for inflating or deflating the barrier in a top to bottom manner.

4. The multi-layer insulating barrier of claim 1, wherein the building is an agricultural barn.

5. The apparatus of claim 3, wherein the building is an agricultural barn.

6. The use of a multi-layer barrier for insulation blocking an opening or passage of a building and for providing ventilation to or within a building, the improvement comprising:

a plurality of inflatable hollow membrane cube-like structures formed adjacent to one another which traverse a longitudinal width of the opening or passage of a building;

the hollow membrane cube-like structures formed from generally rectangular sheets of polyethylene having two generally parallel long edges and two generally short edges at generally right angles to the long edges wherein the multi-layer barrier includes a generally bottom sealing sheet and a plurality of one or more structure sheets, each long edge of a non-bottom structure sheet being longitudinally sealed to an intermediate longitudinal axes of an immediately subsequent non-bottom sheet to form a hollow membrane cube-like structure, and the longitudinal seals on the bottom sheet being generally along the edges of the bottom sheet;

the longitudinal sealing axes forming the hollow membrane cube-like structures having an outside surface and an inside surface and a floor, the floor or each membrane structure except for the generally most bottom cube like membrane having one or more orifices for air connection between membrane structures to allow the membrane cube-like structures to be transformable between an inflated and a deflated state; each of the cube-like membranes having sealed ends and the barrier adapted to be positioned in a frame comprising horizontal upper and lower supports, two vertical ends and a plurality of vertical supports, the vertical supports are sufficiently spaced and transversely mounted to the upper and lower supports for guiding the barrier during the inflation and deflation process.

7. The use of the apparatus for the insulation blocking of an opening comprising the barrier of claim 6, wherein the barrier is positioned in a frame comprising horizontal upper and lower supports, two vertical ends and a plurality of vertical supports, the vertical supports are sufficiently spaced and transversely mounted to the upper and lower supports for guiding the barrier during the inflation and deflation process; a connecting means and a inflating means wherein the connecting means is connected to the uppermost membrane cube like structure at one end and to the inflating means at the other end for inflating the barrier in a top to bottom manner.

8. The use of the apparatus of claim 7, wherein the building is in an agricultural barn.

* * * * *